Aug. 7, 1945.  M. MAYER  2,381,767
WINDSHIELD DEFROSTER
Filed April 14, 1943
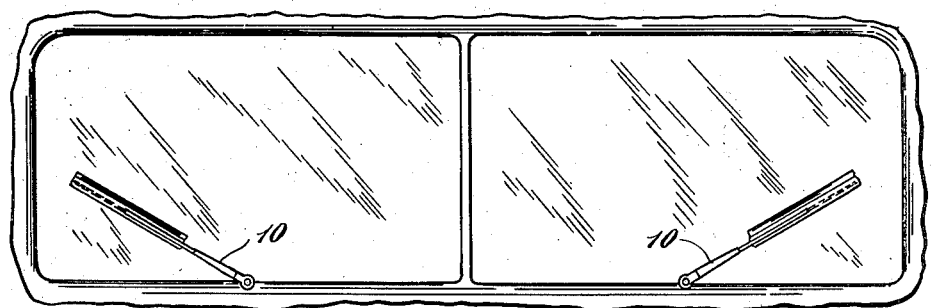
FIG. 1
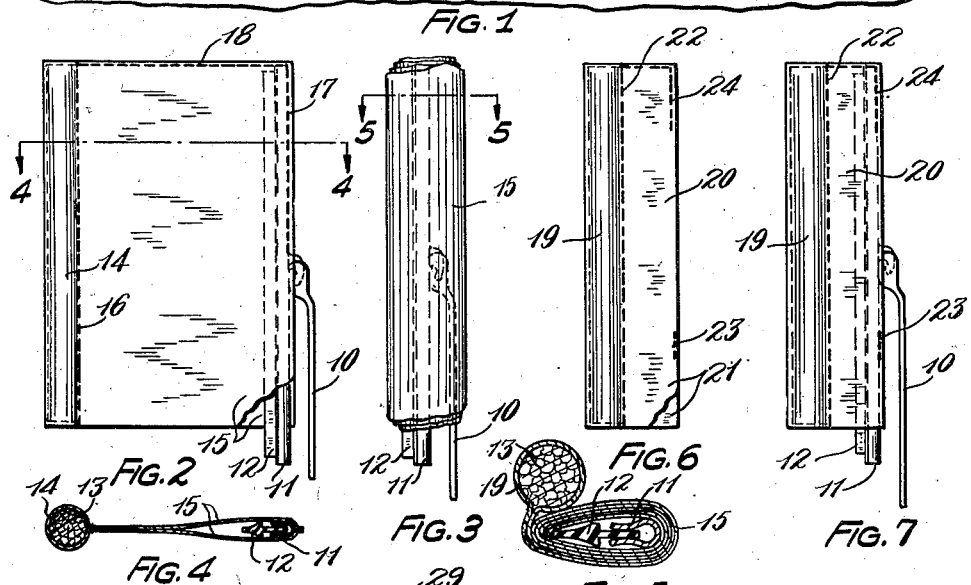
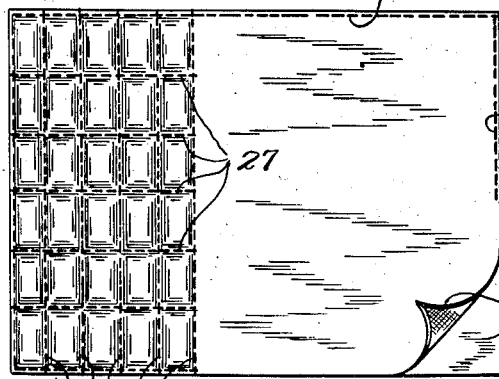
FIG. 8
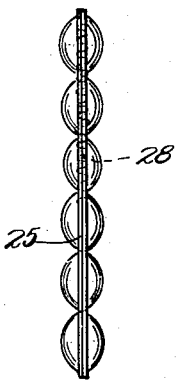
FIG. 9
INVENTOR.
MICHAEL MAYER
BY
Kwis Hudson & Kent
ATTORNEYS Patented Aug. 7, 1945

2,381,767

UNITED STATES PATENT OFFICE 2,381,767

WINDSHIELD DEFROSTER

Michael Mayer, Cleveland, Ohio

Application April 14, 1943, Serial No. 482,994

4 Claims. (Cl. 15—250.3)

This invention relates to a windshield defroster which is used in wet freezing weather to prevent the freezing of rain, snow or sleet upon an automobile windshield, that is, upon the part of the windshield which the windshield wiper blade engages.

The object of the invention is to provide a windshield wiping element which can be conveniently and quickly applied to the wiper blade of a windshield wiper and preferably also to the oscillating arm which carries the blade.

A further object is to provide a defroster which is highly efficient in operation.

The above and other objects are attained by my invention which may be here further briefly summarized as consisting in certain details of construction and combinations and arrangements of parts which will be described in the specification and set forth in the appended claims.

In the accompanying sheet of drawings illustrating several embodiments of my invention, Fig. 1 is a view looking toward the front of an automobile windshield having wiper blades equipped with the principal form of my invention;

Fig. 2 is a view showing the defroster in the process of being applied to the windshield wiper;

Fig. 3 is an enlarged view showing the defroster fully applied;

Fig. 4 is a sectional view substantially along the line 4—4 of Fig. 2;

Fig. 5 is a transverse sectional view along the line 5—5 of Fig. 3;

Fig. 6 is an elevational view showing a modification of the invention;

Fig. 7 is a view showing the construction of Fig. 6 applied to the wiper blade;

Fig. 8 is an elevational view showing a further modification; and

Fig. 9 is an edge view of the construction shown in Fig. 8 looking toward the left of Fig. 8.

In Fig. 1 the defroster is shown as applied to each of a pair of wipers which are attached to the bottom of the windshield frame of a motor vehicle, but the invention is equally applicable to wipers which are attached to the upper part of the windshield frame, as will be subsequently explained.

Referring now to the drawing, 10 represents the oscillating arms of a pair of windshield wipers which arms are each connected to substantially the midpoint of the wiper blade holder 11 carrying the usual wiper blade 12.

In accordance with the preferred embodiment of the invention, salt or other thawing agent 13 is arranged in a compartment 14 extending along the edge of two layers of fabric 15 which fabric is designed to be attached at its opposite edge to the windshield wiper. The compartment 14 is preferably formed between the folded edge of the fabric and a row of stitching 16, the stitching 16 extending the full length of the fabric 15 and across the ends of the compartment, as shown in Figs. 2 and 4. The length of the double layer of fabric is substantially equal to the length of the windshield wiper blade 12 and its holder 11.

At the opposite edge of the fabric at a suitable distance from the compartment 14 filled with the defrosting agent, the double layers of fabric 15 are stitched as shown at 17, the stitching 17 being parallel to the row of stitching 16 for substantially one-half the length of the fabric layers 15, and the upper end is stitched as shown at 18, the stitching 18 extending from the stitching 17 to the stitching 16. The remaining one-half of the fabric layers 15 is, with the construction shown in Fig. 2, left open or unstitched both along the longitudinal edge and across the adjoining end of the fabric.

To apply this device to a windshield wiper wherein the oscillating arm is attached to the lower part of the windshield frame, the wiper blade 12 and its holder 11 are inserted from the bottom between the fabric layers 15 parallel to the stitching 17 until the upper corner of the fabric is reached at the intersection of the stitching 17 and the stitching 18. Then the two layers of fabric 15 are wrapped around the blade 12 and the holder 11, as shown in Fig. 5, and at the same time the lower half of the defroster is wrapped around the oscillating arm 10, as shown in Fig. 3. When the wrapping is completed, the compartment 14 with its defrosting agent will lie on the inner side of the windshield wiper or against the glass of the windshield. The defroster is now ready for use on the windshield wiper. In view of the fact that the material of the compartment 14 is quite porous, moisture readily penetrates into the defrosting agent dissolving a quantity thereof so that any ice or snow accumulating on the windshield is readily melted or dissolved so far as the space under the action of the windshield wiper is concerned.

In Figs. 6 and 7 I have shown a modification wherein the defroster has a tubular part or compartment 19 filled with defrosting agent and a much shorter portion 20 extending therefrom inasmuch as this defroster is not intended to be wrapped around the windshield wiper. The defroster is formed of a piece of fabric folded double to form two layers 21, the compartment 19 being formed at the fold by a row of stitching 22 which is extended across the ends of the compartment after the salt or other defrosting agent has been placed between the fabric. To complete the defroster, the edges of the two layers 21 are stitched at 23 for a short distance somewhat near the lower end of the two layers, and they are stitched also at 24, this stitching beginning at a point somewhat near the upper end and extending across the adjacent end to the tubular compartment 19 containing the salt or other defrosting agent.

This device is applied in the manner shown in Fig. 7 by first inserting the lower half of the blade 12 and its holder 11 behind the stitching 23 and then lowering the defroster over the upper half of the blade and holder inside the upper stitching 24, and when the defroster is slid down for the full distance the device is ready for use. This device works substantially like that first described inasmuch as the tubular compartment containing the salt or defrosting agent is wiped back and forth across the pane of glass and the porosity of the fabric allows sufficient of the salt or other defrosting agent to dissolve so as to keep the windshield, so far as the range of the wiping action of the wiper is concerned, substantially free of frost and ice.

In Figs. 8 and 9 I have shown a defroster which is similar to that shown in Figs. 2 to 5 inclusive except that the defrosting agent is placed between two layers of fabric 25 and held in place by a series of rows of vertical stitching 26 and a series of rows of horizontal stitching 27 intersecting the vertical rows 26, thus forming a series of compartments for the salt or other defrosting agent. The two layers of fabric 25 previously referred to are provided with a line of stitching 28 beginning about one-half the distance from the bottom of the open end of the fabric and with a line of stitching 29 extending across the top of the device. This defroster, which is otherwise formed like the device of Figs. 2 to 5 inclusive, is placed on the windshield wiper in the same manner as the defroster of Figs. 2 to 5 inclusive and wrapped around the blade and its holder and the oscillating arm, bringing the compartments with the defrosting agent therein on the inner side of the windshield wiper. The defroster of Figs. 8 and 9 has the advantage that it can be used on the windows of automobiles or on windows generally to clean the same of snow, frost, and ice, as well as applied to a windshield wiper.

Above I have stated that the device is applicable to windshield wipers which are mounted on the upper edge of the windshield frame as well as to those attached at the lower edge. When the devices of Figs. 2 to 5 inclusive and Figs. 8 and 9 are applied to a windshield wiper attached to the upper edge of the windshield frame, it is simply necessary to first insert the upper half of the blade and holder in the device until the upper end of the blade and holder engages the stitching 18 or 29, as the case may be, and then bring the blade and holder within the open portion of the layers and wrap the fabric around the lower past of the oscillating arm and around the holder and wiper blade.

When the device of Figs. 6 and 7 is utilized with a windshield wiper attached to the top of the windshield frame, the lower hasf of the blade and holder is inserted behind the stitching 23, then the defroster is raised and the upper half of the blade and holder is inserted behind the stitching 24. When the defroster is lowered until the blade and holder engage the upper part of the stitching 24, the device is ready for use.

While I have shown the preferred construction of my invention and two modifications, I do not desire to be confined to the precise details shown and described but aim in my claims to cover all modifications which do not involve a departure from the spirit and the scope of the invention.

Having thus described my invention, I claim:

1. A windshield defroster comprising a fabric strip of generally rectangular form having at one edge a compartment in which a defrosting agent is contained and having means at the other edge by which it may be attached to a windshield wiper, said means comprising a doubled portion of the fabric closed at the top thereof and partially along the edge thereof and open at the bottom.

2. A windshield defroster comprising a double layer of fabric of generally rectangular form which is provided at one edge with a compartment in which a defrosting agent is adapted to be placed, the other edge having its layers free for a portion of their length and fastened for a portion of their length, the free portion including the bottom thereof, and the fastened portion extending along the top and downwardly for a distance along said other edge.

3. A windshield defroster comprising a piece of fabric of generally rectangular form which is provided with a compartment in which a defrosting agent is placed, means at one edge by which it may be attached to a windshield wiper and wrapped around the windshield wiper with the compartment containing the defrosting agent between the windshield and the windshield wiper.

4. A windshield defroster comprising a doubled layer of fabric of generally rectangular form which is provided with a longitudinally extending compartment in which a defrosting agent is adapted to be placed and having at one side of said compartment a part which is adapted to receive a windshield wiper, said part being closed at the top and downwardly for a distance along its edge and then being free at its edge except for a closed portion spaced a distance from the upper closed portion.

MICHAEL MAYER.